(12) United States Patent
Graves

(10) Patent No.: US 10,322,957 B2
(45) Date of Patent: *Jun. 18, 2019

(54) WASTEWATER TREATMENT SYSTEM

(71) Applicant: Gregory D. Graves, Milan, OH (US)

(72) Inventor: Gregory D. Graves, Milan, OH (US)

(73) Assignee: Gregory D Graves, Milan, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,248

(22) Filed: Sep. 11, 2017

(65) Prior Publication Data

US 2017/0369348 A1    Dec. 28, 2017

Related U.S. Application Data

(62) Division of application No. 14/132,153, filed on Dec. 18, 2013, now Pat. No. 9,758,400.

(51) Int. Cl.
*C02F 3/02* (2006.01)
*C02F 3/20* (2006.01)
*C02F 3/12* (2006.01)

(52) U.S. Cl.
CPC .............. *C02F 3/02* (2013.01); *C02F 3/1242* (2013.01); *C02F 3/20* (2013.01); *C02F 2209/40* (2013.01); *C02F 2303/24* (2013.01); *Y02W 10/15* (2015.05)

(58) Field of Classification Search
CPC .... B01D 21/2444; B01D 21/02; B01D 21/10; B01D 21/0039; B01D 21/003; C02F 3/1242; C02F 3/02; C02F 3/20; Y10S 261/70; Y10S 210/921; E03F 5/14

USPC ................. 210/532.2, 320, 628; 137/395
See application file for complete search history.

(56) References Cited

U.S. PATENT DOCUMENTS

| | | |
|---|---|---|
| 2,987,186 A | 6/1961 | Burgoon et al. |
| 3,527,351 A | 9/1970 | Wade |
| 3,805,957 A | 4/1974 | Oldham |
| 3,953,328 A | 4/1976 | Aldag |
| 4,608,157 A | 8/1986 | Graves |
| 4,859,325 A | 8/1989 | Cormier |
| 5,061,369 A | 10/1991 | Romero et al. |
| 5,895,566 A | 4/1999 | Tittlebaum et al. |
| 6,099,722 A | 8/2000 | Tittlebaum et al. |
| 6,200,470 B1 | 3/2001 | Romero et al. |
| 6,776,295 B2 * | 8/2004 | Morimura .............. B01D 35/10 210/489 |
| 6,964,738 B1 | 11/2005 | Shen |
| 7,005,069 B2 | 2/2006 | Shell |
| 7,041,213 B1 | 5/2006 | McClanahan |

(Continued)

*Primary Examiner* — Claire A Norris
(74) *Attorney, Agent, or Firm* — Miles & Stockbridge, P.C.; David R. Schaffer

(57) ABSTRACT

A dual tank wastewater treatment system for performing an extended aeration process to provide a natural, biological breakdown of the organic matter in wastewater using, for example, but not limited to, a continuously operating air pump and diffuser bar system for aeration purposes and a flexible media filter. The air pump used is stronger than conventional air pumps and the diffuser bar is designed to provide more efficient oxygen transfer than conventional diffuser systems by mixing air against the system flow to provide better mixing and longer retention time in the aeration process. The flexible media filter provides a final filtration and polishing of the effluent before it passes through a flow equalization apparatus and exits the system.

19 Claims, 12 Drawing Sheets

(56) References Cited

U.S. PATENT DOCUMENTS

| | | |
|---|---|---|
| 7,264,727 B2 | 9/2007 | Holt |
| 7,429,320 B2 | 9/2008 | Holt |
| 7,468,135 B2 | 12/2008 | Holt |
| 7,708,259 B2 | 5/2010 | James |
| 7,718,067 B2 | 5/2010 | Holt |
| 8,020,839 B2 | 9/2011 | Smiltneek |
| 2008/0179237 A1 | 7/2008 | Graves |
| 2010/0200502 A1 | 8/2010 | Holt |
| 2012/0097590 A1* | 4/2012 | Early .................... C02F 3/1242 210/198.1 |

* cited by examiner

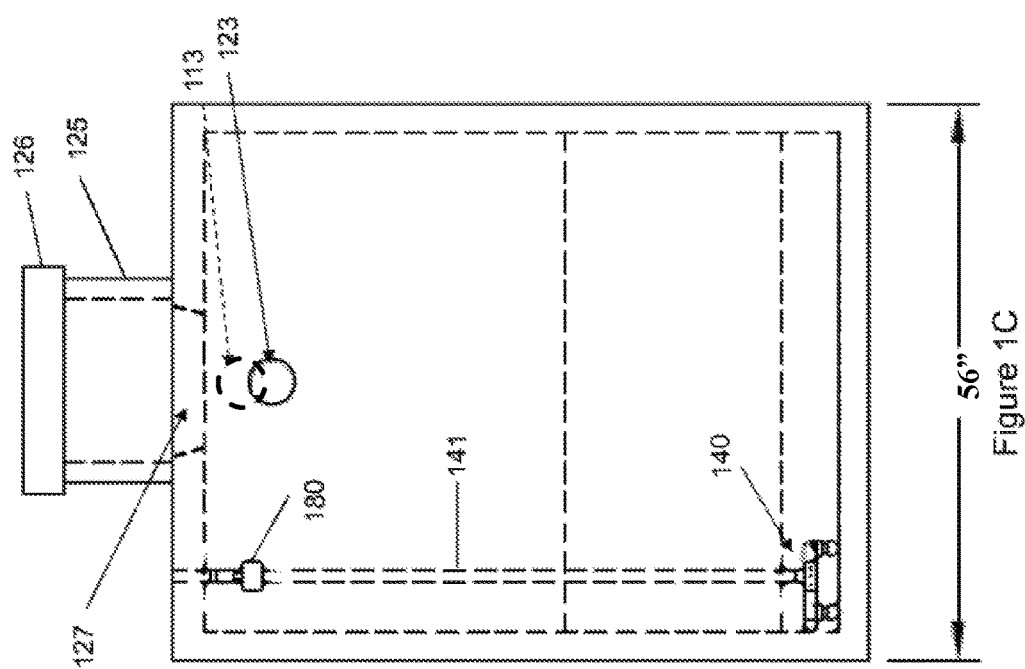

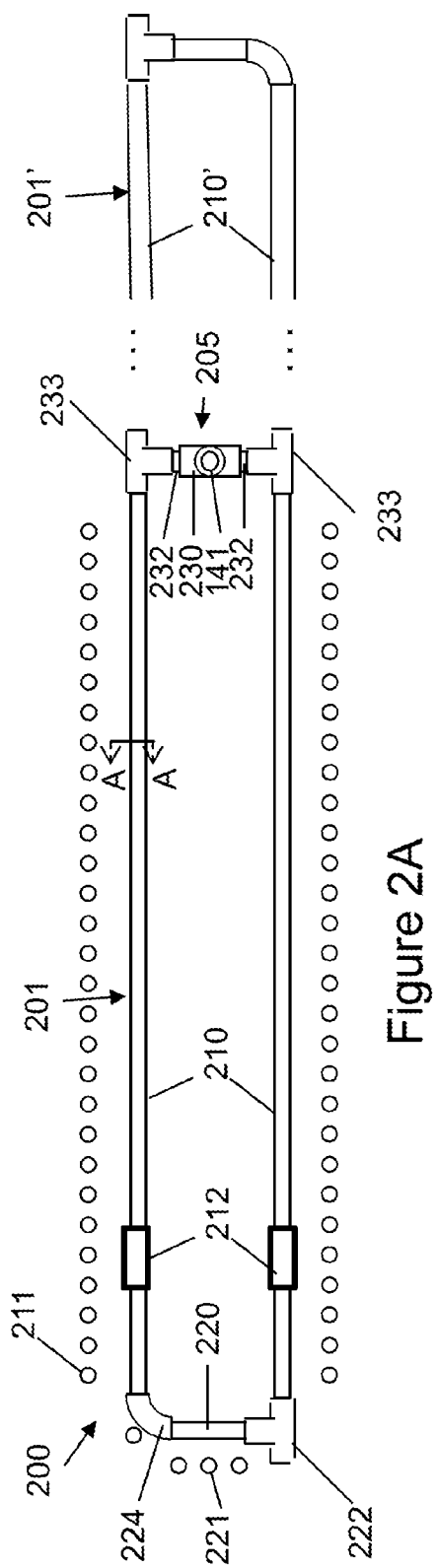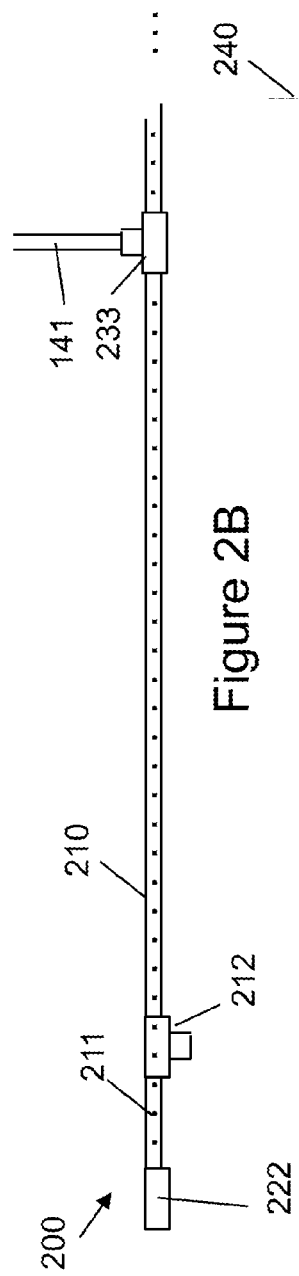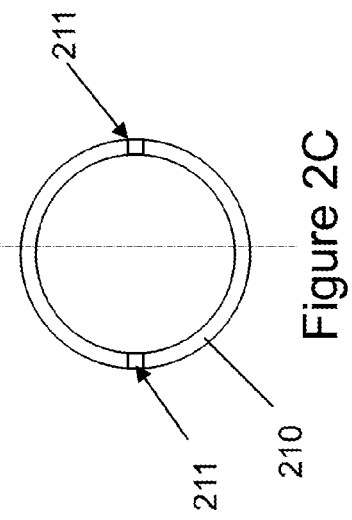

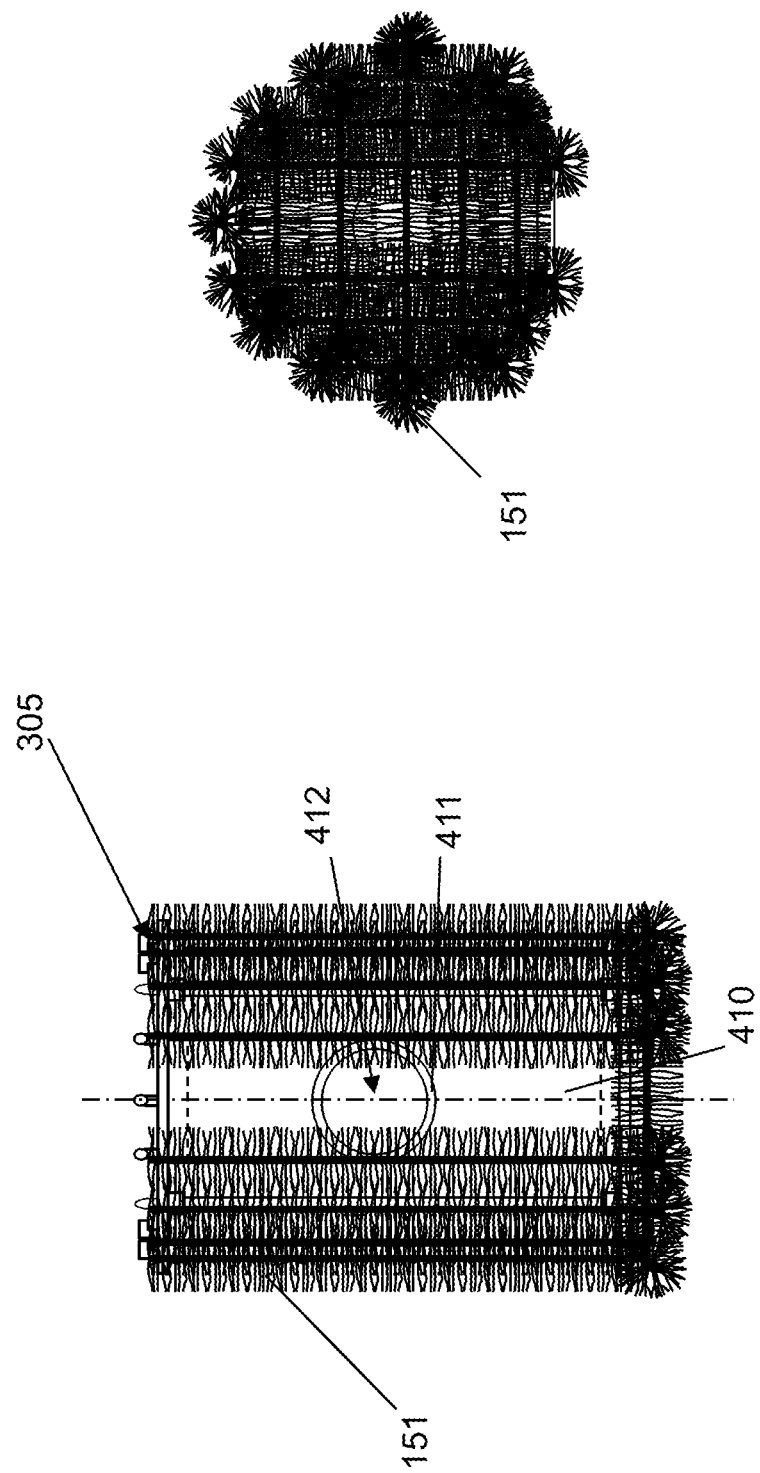

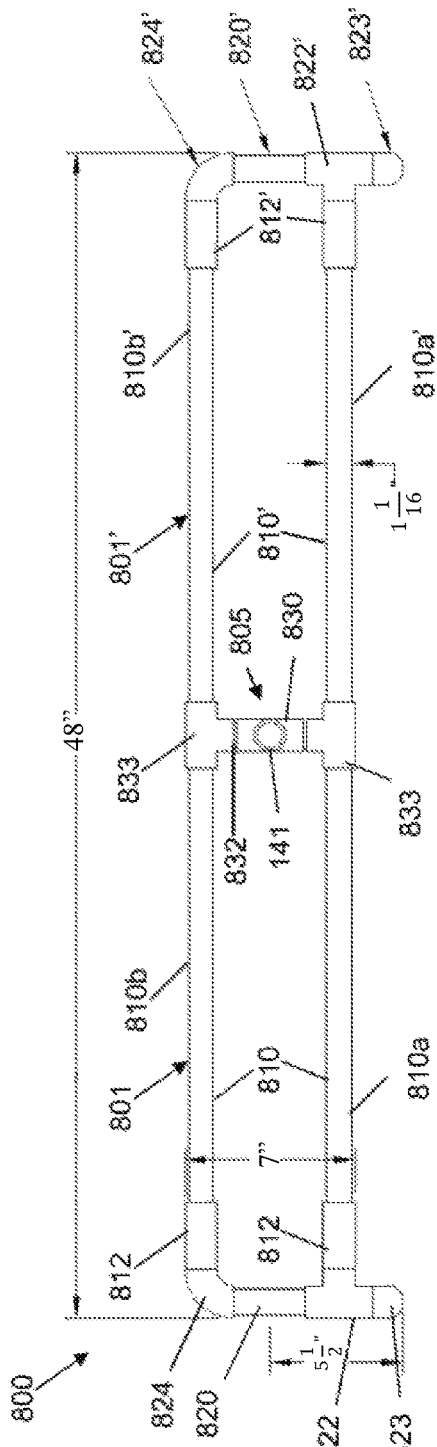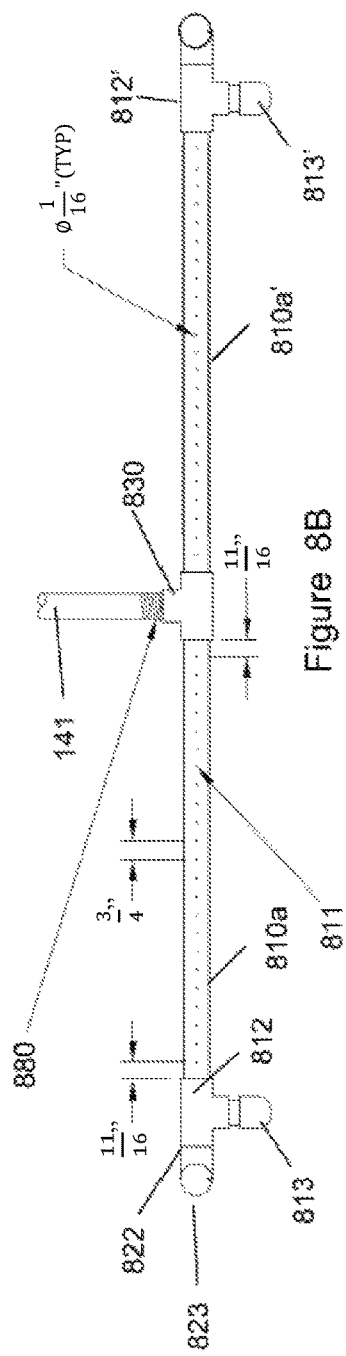
Figure 8A
Figure 8B

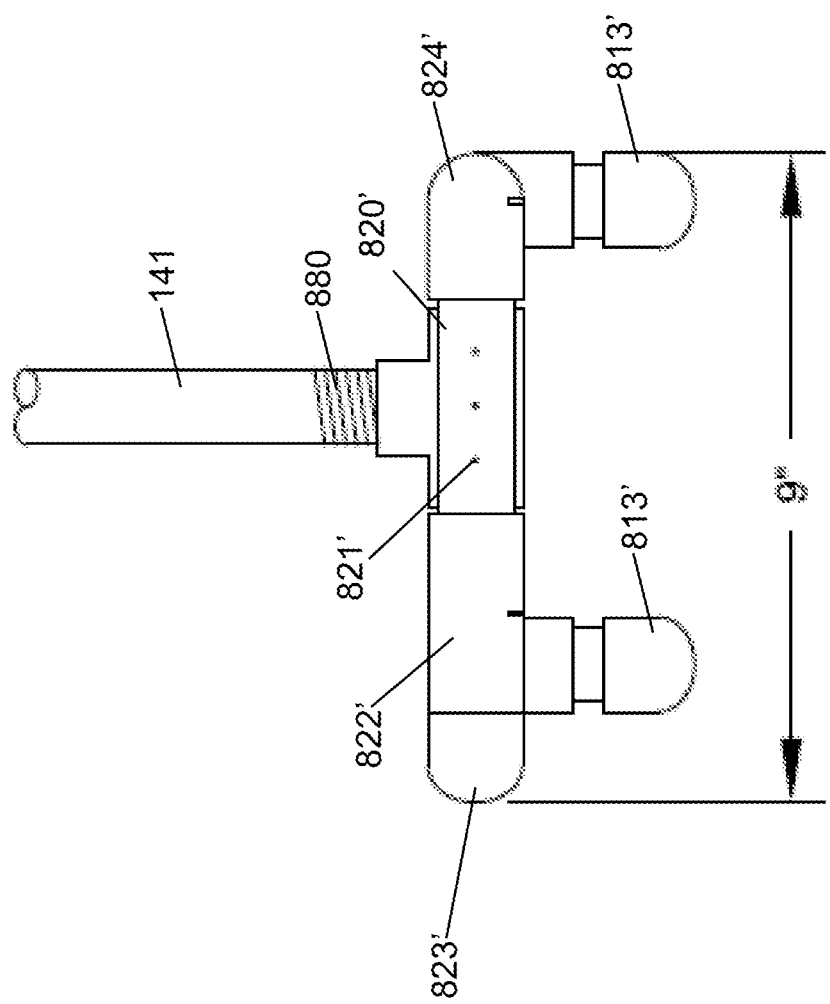

WASTEWATER TREATMENT SYSTEM

This application is a division of application Ser. No. 14/132,153, filed Dec. 18, 2013, which is hereby incorporated by reference herein in its entirety.

TECHNICAL AREA

Wastewater treatment systems. More specifically a two chamber, aerobic wastewater treatment system with a flexible media filter.

BACKGROUND

In current biological treatment processes, suspended solids need to be removed from effluent before it flows to a next treatment unit or a receiving water body. In general, after wastewater is subjected to an aerobic treatment process to remove suspended solids, a five-day Carbonaceous Biochemical Oxygen Demand (CBOD5) test of a resultant effluent usually meets regulatory discharge limits. Thus, removing suspended solids from effluent is a key point in an aerobic treatment system.

In most municipal sewage treatment plants, a surface skimmer is used to remove surface sludge and a bottom scraper is used to remove settled sludge in a sedimentation tank or unit. The supernatant from the sedimentation tank can then be directed to a next treatment unit or discharged to a receiving water body. However, in residential sewage treatment plants, daily, weekly, and monthly maintenance services are not economically practical. Instead, these types of maintenance services only can be offered after a certain operational period of time. Therefore, the plant frequently must be operated without maintenance services during this period of time except to fix mechanical or electrical problems. Therefore, because the surface skimmer and sludge scraper are not practical for use in a residential sewage treatment plant or system, what is needed is a residential treatment plant that can remove the suspended solids from the effluent without the use of the surface skimmer and/or the bottom sludge scraper.

SUMMARY

Embodiments of the present invention include an extended aeration process to provide a natural, biological breakdown of the organic matter in wastewater using, for example, but not limited to, an air pump and a diffuser bar system for aeration purposes. The air pump used is stronger than conventional air pumps to provide a more thorough treatment of the wastewater, which results in a cleaner effluent. The diffuser bar is designed to provide more efficient oxygen transfer than conventional diffuser systems by mixing air against the system flow, as opposed to with the system flow, to provide better mixing and longer retention time in the aeration process.

In embodiments of the present invention, a control center is operatively connected to the air pump and, generally, can be installed up to 50' away from the tank. Coupling the control center with a high water alarm within the system eliminates the need to run electricity from the home to the tank.

In embodiments of the present invention, a specially designed flexible media filter, for example, a brush filter in a clarification chamber polishes the effluent and also provides non-mechanical flow equalization through the system. Embodiments of the present invention provide average effluent quality of 6 mg/L CBOD5 and 9 mg/L TSS while successfully completing the NSF/ANSI Standard 40 protocol.

BRIEF DESCRIPTION OF THE DRAWINGS

The present invention will be described with reference to the accompanying drawings. Except where explicitly noted, the figures have not been drawn to scale. Where applicable, some features have not been illustrated to assist in the illustration and description of underlying features. Throughout the figures, like reference numerals denote like elements.

FIG. 1C is an end view of a two chamber wastewater treatment plant with a flexible media filter, in accordance with an embodiment of the present invention.

FIG. 2A is a top view of a partial diffuser bar assembly for use in a two chamber wastewater treatment plant, in accordance with an embodiment of the present invention.

FIG. 2B is a side view of the partial diffuser bar assembly of FIG. 2A, in accordance with an embodiment of the present invention.

FIG. 2C is a cross-sectional view along line A-A of the partial diffuser bar assembly of FIG. 2A, in accordance with an embodiment of the present invention.

FIG. 6A is a front view of a filter frame covered with individual brush filters, in accordance with an embodiment of the present invention.

FIG. 6B is a bottom view of the filter frame covered with individual brush filters of FIG. 6A, in accordance with an embodiment of the present invention.

FIG. 8A is a top view of a diffuser bar assembly for use in a two chamber wastewater treatment plant, in accordance with an embodiment of the present invention.

FIG. 8B is a side view of the diffuser bar assembly of FIG. 8A, in accordance with an embodiment of the present invention.

FIG. 8C is an end view of the diffuser bar assembly of FIG. 8A, in accordance with an embodiment of the present invention.

DETAILED DESCRIPTION

Embodiments of the present invention were developed to serve homes and small businesses located beyond the reach of city sewers and the system employs an extended aeration process. Similar to the treatment method used by most municipal wastewater treatment facilities, this process includes (i.e., comprises) a natural, biological breakdown of the organic matter in wastewater. Specifically after a volume of wastewater enters an aeration chamber, aerobic bacteria utilize the organic matter in the wastewater to biologically convert the waste into stable substances. Following aeration, flow is transferred to a settling/clarification chamber where the effects of gravity settle out biologically active material. As clarified liquids pass through a flexible media filter, for example, a brush filter, they are filtered, settled and flow equalized. As a result, complete aeration, clarification and final filtration are assured.

Embodiments of the present invention are designed to treat domestic wastewater, where domestic wastewater is defined as the waste generated from a typical residence. This domestic wastewater includes flows originating from: bathtubs, clothes washers, dishwashers, drinking fountains, water coolers, food grinders, kitchen sinks, lavatories, mop basins, service sinks, shower stalls, sinks, wash sinks, water closets and whirlpool baths. While the use of bio-degradable detergents is recommended, the inventive system has been designed to handle any reasonable amount of bathroom, kitchen or laundry waste. However, some care should be exercised to insure that non-biodegradable and/or toxic materials are not disposed of via the domestic wastewater plumbing. For example, the domestic wastewater should not include lint, cooking grease, scouring pads, diapers, sanitary napkins, cotton balls, cotton swabs, cleaning rags, dental floss, strings, cigarette filters, rubber or plastic products, paints and thinning agents, gasoline, motor oil, drain cleaners or other harsh chemicals. All of these items can plug portions of the plumbing, interfere with biological treatment, accumulate in the treatment system and adversely affect system performance. In addition, the system should also not be connected to roofing down spouts, footer drains, sump pump piping, garage and basement floor drains or water softener backwash.

Figure 1A:
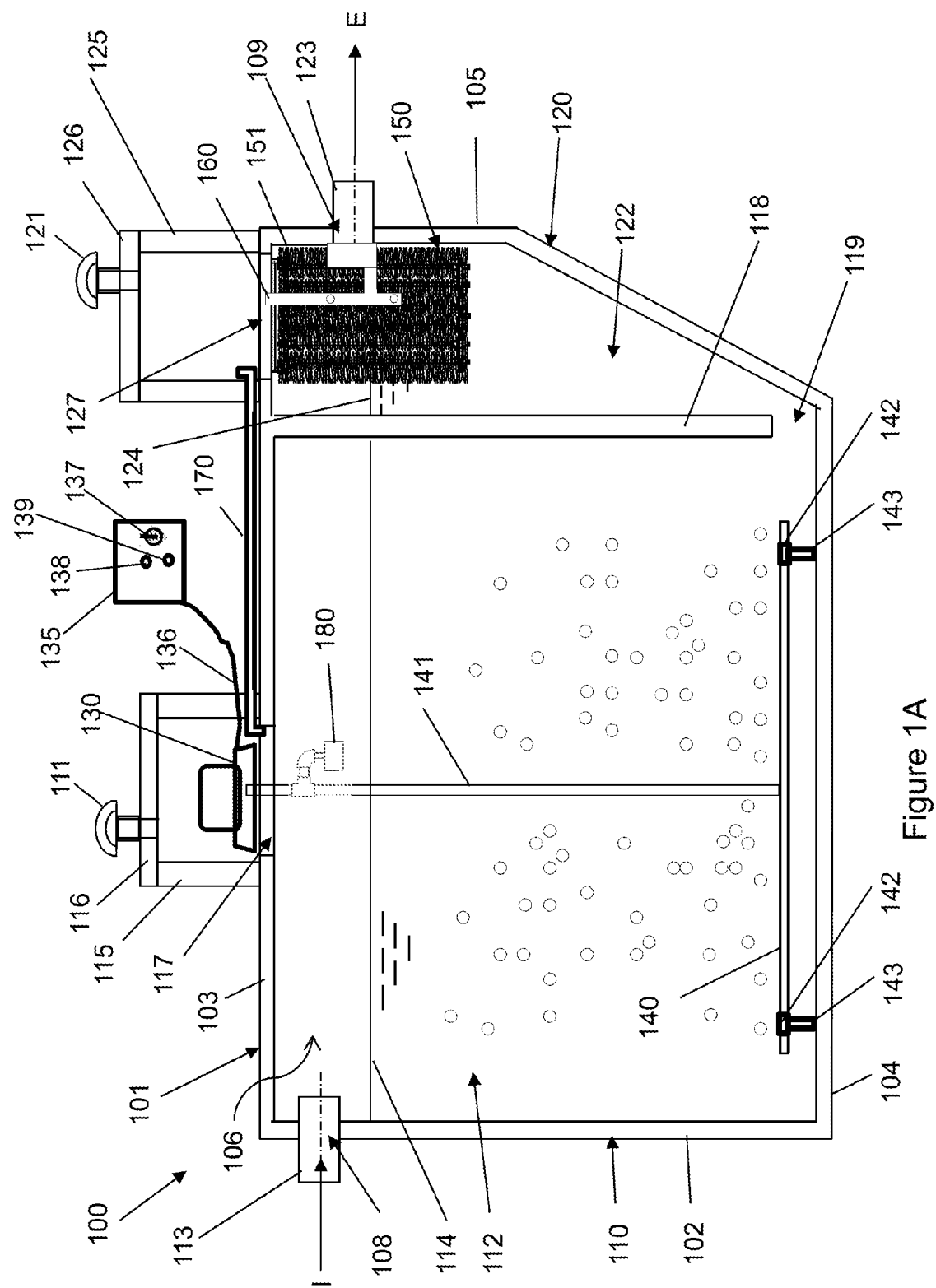
FIG. 1A is a cross-sectional, side view of a two chamber wastewater treatment plant with a flexible media filter, in accordance with an embodiment of the present invention.

FIG. 1A is a cross-sectional, side view of a two chamber wastewater treatment plant/system with a flexible media filter, in accordance with an embodiment of the present invention. In FIG. 1A, a sewage treatment plant 100 is shown to include a tank 101 with a first, or aeration, chamber 110 and a second, or clarification, chamber 120 with a filtration apparatus 150 affixed around an outlet pipe 123 of the second chamber 120. Sewage 1 discharged from a pollution point or home flows into the clarification chamber 110 through an inlet pipe 113 for aerobic biological treatment. A diffuser bar 140 is positioned near a bottom of the aeration chamber 110 and releases air produced by an air pump 130 into mixed liquor 112 that fills the aeration chamber 110. The mixed liquor 112 has a top level 114 that is below a bottom of the inlet pipe 113 to prevent backflow into the inlet pipe 113 and the home. The sewage treatment plant 100 tank 101, in the embodiment in FIG. 1A, is made from reinforced precast concrete with a common internal wall 118 and associated baffle 119 that are cast-in-place to insure uniformity and maximum strength. Other embodiments of the tank can be constructed from steel and/or plastic. The tank 101 includes an inlet wall 102, a top wall 103, a bottom wall 104, a back wall 105, a left side wall 106, and a right side wall 107 (not shown here, but, see FIG. 1B). In FIG. 1A, the tank 101 is sealed with the exceptions of an inlet opening 108 that is formed in and adjacent to a top of the inlet wall 102 through which the inlet pipe 113 is affixed to permit fluid communication with the aeration chamber 110; an outlet opening 109 that is formed in and adjacent to a top of the outlet wall 105 through which the outlet pipe 123 is affixed to permit fluid communication out of the clarification chamber 120 through the outlet pipe 123; an aeration chamber opening 117 formed in the top wall 103 above the aeration chamber 110; and a clarification chamber opening 127 formed in the top wall 103 above the clarification chamber 120. An aeration chamber riser 115 is affixed to a top surface of the top wall 103 and surrounds the aeration chamber opening 117, and an aeration chamber riser cover 116 is removably affixed to a top end of the aeration chamber riser 115. A clarification chamber riser 125 is affixed to a top surface of the top wall 103 and surrounds the clarification chamber opening 127, and a clarification chamber riser cover 126 is removably affixed to a top end of the clarification chamber riser 125. Risers, riser covers and access covers, which are used when no riser and riser cover is used, can be made from either heavy duty plastic, steel or concrete construction. In general, the components within the system that will contact the wastewater are constructed entirely of molded plastic, stainless steel or rubber.

In FIG. 1A, the air pump 130 is connected to and in fluid communication with the diffuser bar 140 by a vertical air pipe 141. The diffuser bar 140 includes a "T"-connector 142 adjacent each end of the diffuser bar and a foot 143 connected to each "T"-connector 142 to keep the diffuser bar 140 above the bottom wall 104. A high water alarm float 180 is attached adjacent a top end of the vertical air pipe 141 and is electrically connected to a control center 135. When the water level 114 in the aeration chamber 110 rises to a sufficiently high level, the high water alarm float 180 is activated and sends a signal to the control center 135 to activate the alarm light 138 and, optionally, an alarm siren, which will continue to sound until either the water level recedes or the reset button 139 is pressed to stop the alarm siren. The air pump 130 is the only electrically powered component in the wastewater treatment system 100 and has been designed for efficiency and specifically for use in the present system. In fact, the air pump 130 costs less to operate and consumes fewer kilowatt hours of electricity than most major appliances. The air pump 130 has a linear design and has been specifically engineered for use in the inventive system to include a powerful internal electrical magnetic coil and two rubber diaphragms. The two rubber diaphragms are key to the pump design and are the only moving parts inside the air pump 130. The diaphragms are more durable than the carbon brush used in most pumps and are long lasting to ensure proper air flow. The air pump 130 is equipped with a removable filter that helps filter contaminants from the incoming air and protects the inside of the air pump 130 to ensure long life.

In FIG. 1A, the air pump 130 is shown connected to a prewired NEMA rated control center 135 by a wire 136. The control center 135 contains a power switch 137 that controls the air pump 130 operation and is wired to a dedicated 115 VAC, single-phase, 15 amp circuit at a main electrical service panel. The control center 135 monitors conditions inside the tank 101 that affect treatment. The control center 135 is programmed to monitor the water level 114 inside the tank 101 and the air flow from the air pump 130. The control center 135 is generally mounted in a conspicuous, easily accessible area away from the air pump 130. If an alarm condition occurs for any reason, the red alarm light 138 on the control center 135 will flash and an alarm will sound. To silence the audible alarm, a user can press the reset button 139 located in the center of the panel. If the alarm continues to sound after the reset button is pressed, a more serious problem is indicated, and the system owner should contact a local dealer for service.

The air pump 130, in FIG. 1A, is installed in the cast concrete or plastic riser 115 directly above the aeration chamber access opening 117. The riser 115 is sealed around the aeration chamber access opening 117 in several areas to prevent moisture from contacting the air pump. The air pump is forced to draw fresh air through an aeration chamber vent assembly 111 on the aeration chamber riser cover 116 insuring that oxygen is getting into the aeration chamber for the aerobic process, but that air is not escaping through the aeration chamber vent assembly 111. The aeration chamber vent assembly 111 provides for one-way airflow from outside to inside the aeration chamber riser 115. The air pump 130 is small, quiet and designed to run continuously and is more energy efficient than traditional aeration methods, because the pump draws only 1.8 amps using less power and energy. Compressed air is continuously pumped down the vertical PVC pipe 141 toward the bottom of the aeration chamber 110 and released via the diffuser bar 140 located on the floor of the chamber. The oxygen released from the diffuser bar 140 insures that the wastewater is thoroughly treated before leaving the aeration chamber 110. The air pump 130 creates less floating sludge, which results in better effluent quality. The air pump is not designed to run under water and will automatically shut off, if a high water condition occurs. If liquid rises to the level of the float switch 180, the control center 135 will shut off power to the air pump 130 and the alarm will sound.

In FIG. 1A, the clarification chamber 120 is separated from the aeration chamber 110 by the common internal wall 118 that is connected to and extends downwardly from a bottom surface of the top wall. 103 towards but does not reach or connect to the top side of the bottom wall 104 to form the opening of baffle 119. The top of the back wall 105 extends perpendicularly downwardly from the top wall 103 until about a middle of the back wall 105, where it angles at about 45 degrees back toward the front wall 102 and downwardly toward and until it connects with the bottom wall 104 distal to the baffle 119. The clarification chamber 120 also includes a flexible media filter 150 that provides flexible filtration in the clarification chamber. The flexible media filter 150 provides non-mechanical flow equalization of the effluent and is designed to be clog-free and require minimal maintenance. The maturation time for the system 100 is significantly less than that of conventional pretreatment systems, it has a very short startup period, and removes over 90% of contaminants from the wastewater before discharging effluent E into the environment. Rivaling the performance of the most advanced wastewater treatment plants in the world, the system 100 complies with USEPA wastewater treatment guidelines for secondary treatment systems and meets all requirements of NSF/ANSI Standard 40. In ecologically sensitive areas, the most stringent effluent standards are 10 mg/L CBOD5 and 10 mg/L TSS. Rated Class I after successfully completing the Standard 40 test protocol, the system 100 averaged effluent of 6 mg/L CBOD5 and 10 mg/L TSS.

In FIG. 1A, the specially designed flexible media filter 150 provides final filtration and protects flow control outlet ports from clogging. The flexible media filter 150 is clog-free due to the flexible filtration media design of its bristles, which mesh together to form a network of media that allows clean water to pass through, while trapping solids. The solids trapped by the bristles eventually fall off the flexible media filter 150 and are returned to the aeration chamber through the baffle opening 119 along the bottom of the clarification chamber wall 105. More details on the flexible media filter 150 are provided herein in relation to FIGS. 3, 6A, 6B, 7 and 9.

In the system 100 of FIG. 1A, after biological treatment in the aeration chamber 110, liquid 122 flows from the aeration chamber 110 into the clarification chamber 120 where sludge in the liquid 122 is allowed to settle out. During the sedimentation process, sludge with a specific gravity that is heavier than that of the liquid 122 settles down to the bottom of the clarification chamber 120 and returns to the aeration chamber 110 through baffle 119. The floating sludge, i.e., sludge with a specific gravity that is less than that of the liquid 122, floats up to a surface liquid level 124 of the clarification chamber and attaches on a surface brush layer 151 of the flexible media filter 150. The brush layer 151 forms a non-flat and flexible filtration layer. Since the individual elements of the brush layer 151 have certain flexible elasticity, the brush layer 151 is not easily clogged. However, if the brush layer 151 becomes clogged, the water level in the system 100 will rise up and cause pressure differentials on both sides of the brush layer 151. Once the pressure on the outside becomes high enough, it pushes through the brush layer 151 making openings in the layer, so effluent can flow out through a flow equalization device 160 that is surrounded by the brush layer 151 and that is connected to the outlet pipe 123 of the clarification chamber 120.

In FIG. 1A, each riser cover 116, 126 on the top of the tank 101 has a vent assembly 111, 121 affixed through it. In the aeration chamber riser cover 116, the vent assembly 111 supplies only fresh air to the air pump 130, but does not allow for air release. The clarification chamber vent assembly 121 is installed in the clarification chamber riser cover 126 above the clarification chamber 120. An air release line 170, which is made of a small PVC pipe, runs from the aeration chamber opening 117 in the top of the aeration chamber to the side of the clarification chamber riser 125 to assist in the release of air from the aeration chamber 110. Finished landscaping that is planted around the tank should be maintained six inches below the top of the vented access openings 111, 121 and graded to drain runoff away from the cover. Plants, shrubbery, mulch or landscaping of any type should not be allowed to restrict the flow or release of air to or from the vent assemblies 111, 121 or obstruct the riser covers 116, 126.

As with all sewage treatment systems, after a certain period of operation time, to keep the system 100 operating at peak efficiency, an easy cleaning process is required to be performed on the system 100. Fortunately, the whole cleaning process only takes a few minutes to accomplish and involves the following steps. First, the aeration chamber riser cover 116 and the clarification chamber riser cover 126 should both be opened and then an inlet from a small sludge pump (not shown) should be inserted inside the flexible media filter 150 in the clarification chamber 120 and an outlet of the sludge pump should be inserted into the aeration chamber 110 through the aeration chamber access opening 117. Once this is completed, the sludge pump should be turned on and then the inlet of the sludge pump moved around the inside of flexible media filter 150 until all, or substantially all, accumulated sludge has been pumped out from the flexible media filter 150. Once this is completed the sludge pump and inlet and outlet should be removed from the risers 115, 125 and the riser covers 116, 126 should be put back in place to close off the risers 115, 125.

In accordance with an embodiment of the present invention, the aeration chamber 110 has a volume of 613 gallons, with an average HDT of 29.4 hours and an air pump flow (open flow) of 145 L/Min. The clarification chamber 120 has a volume of 128 Gallons and an average HDT of 6.1 hours. The flexible media filter 150 has a frame Diameter of 12 inches, a brush hair diameter of 3-4 inches and a height of 26 inches. Table 1 shows a summary of treatment results obtained from an 11 month testing period. During this test period, no maintenance services were conducted and only a minor cleaning was conducted after 8 month and 10 months.

TABLE 1

Results of a Treatment Plant Equipped with Flexible Media Filtration

| DO (mg/l) | | T (oC) | | pH | | SS (mg/l) | | CBOD5 (mg/l) | |
|---|---|---|---|---|---|---|---|---|---|
| Aeration | Effluent | Aeration | In | Out | Influent | MLSS | Effluent | Influent | Effluent |
| 2.6 | 1.7 | 20.1 | 7.5 | 8.1 | 157 | 3607 | 10 | 184 | 6 |

Figure 1B:
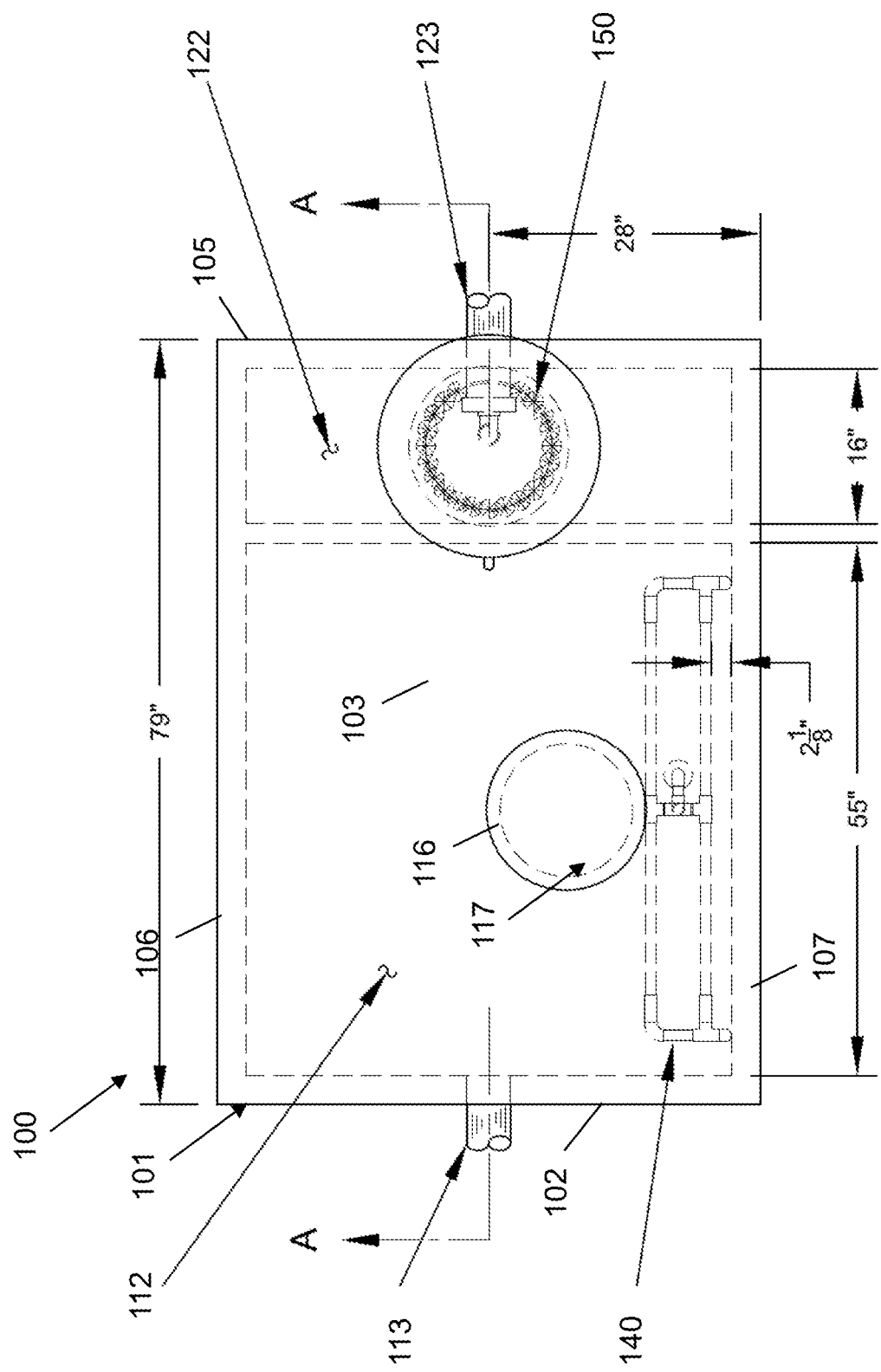
FIG. 1B is a top plan view of a two chamber wastewater treatment plant with a flexible media filter, in accordance with an embodiment of the present invention.

FIG. 1B is a top plan view of a two chamber wastewater treatment plant with a flexible media filter, in accordance with an embodiment of the present invention. In FIG. 1B, details of the sewage treatment plant 100 are shown, with internal details being shown in dashed line. In the embodiment in FIG. 1B, the external dimensions of the tank 101 are 56 inches wide by 79 inches long by 70 inches high. The aeration chamber 110 has internal dimensions of 50 inches wide by 55 inches long by 64 inches high, and the clarification chamber 120 has internal dimensions of 50 inches wide by 16 inches long by 64 inches high and includes the flexible media filter 150 affixed around the outlet pipe 123. The aeration chamber access opening 117 is seen below an aeration chamber access opening cover 116 that is set into the top wall 103. The aeration chamber access opening cover 116 can have an opening formed through it to permit the passage of the vertical pipe 141, which connects the diffuser bar 140 to the air pump 130.

FIG. 1C is an end view of the two chamber wastewater treatment plant with a flexible media filter of FIGS. 1A and 1B, in accordance with an embodiment of the present invention. As seen in FIG. 1C, the inlet pipe 113 (shown in dashed line) is in front wall 102 at a height partially above the outlet pipe 123 in the back wall 105. This configuration helps to limit the wastewater level 114 from rising above the bottom of and backing up into the inlet pipe 113.

FIG. 2A is a top view of a partial diffuser bar assembly for use in a two chamber wastewater treatment plant, in accordance with an embodiment of the present invention. In FIG. 2A, a diffuser bar assembly 200 plays a key role in the aeration process as the main function of the diffuser bar 200 is to get fresh air into the wastewater liquid 112 and to mix the liquid 112 in the aeration chamber 110. To do this, the diffuser bar assembly 200 is connected by the vertical pipe 141, all of which can be made from, for example, ¾ diameter inch PVC pipe and ¾ inch pipe connectors, to the air pump 130, which is run continuously. The diffused air from the diffuser bar assembly 200 provides oxygen through multiple holes 211, 221 along both sides of its lengths and widths, respectively, for the aerobic bacteria, mixing of the wastewater, as well as an extended retention period. The continuous air flow release creates a rolling effect in the aeration chamber 110 to keep the liquid constantly mixing. The rolling motion created runs perpendicular to the inlet flow from the inlet pipe 113 and eliminates "short-circuiting" of the incoming wastewater. The constant motion created by the diffuser bar assembly 200 ensures that there are no dead zones in the corners of the aeration chamber 110 and very little accumulated sludge that could disrupt aerobic function. Continuous aeration also further degrades the solids during low-flow times. For the best aeration possible, the specially designed 1/16 inch air holes 211, 221 create medium sized bubbles that quickly transfer oxygen to the liquid as well as break down solids more efficiently. Although in FIG. 2A, the air holes 211, 221 are not to scale and are shown around a perimeter of and not on the diffuser bar assembly 200 they are shown in this manner to illustrate approximate locations on sides of the diffuser bar assembly 200.

In FIG. 2A, the diffuser bar assembly 200 includes two halves 201, 201' of about 24 inches in length and each connected to each other by a center section 205 that includes connection points for fluid communication between the diffuser bar assembly 200 through the vertical pipe 141 to the air pump 130. The center section 205 includes a central upright "T" connector 230 with a top opening that connects to a bottom of the vertical pipe 141 and two side openings that connect to short sections of pipe 232 that are in turn each connected to bottom openings of respective sideways "T" connectors 233. The top openings of each "T" connector 233 connect to ends of lengths of side pipes 210, 210'. As seen in FIG. 2A, the left half 201 includes two sides 210 of lengths of pipe with about 30, 1/16 inch holes spaced apart by about 11/16 inches on center along a middle of each side of each pipe. An end of one side pipe 210 is connected to a first opening of a first connector 222, e.g., a "T" connector, that includes at least two openings oriented at about 90 degree angles and one end of a left end pipe section 220 is connected to the other opening of the first connector 222. An end of the other side pipe 210 is connected to a first opening of a second connector 224, e.g., an elbow connector, that includes at least two openings oriented at about 90 degree angles and another end of the left end pipe section 220 is connected to the other opening of the second connector 224. A foot assembly 212 is attached to each side pipe 210 of the left half 201 adjacent to the end of each side pipe 210, but does not impede air flow within the diffuser bar assembly 200. The other half of the diffuser assembly is similarly assembled and all connections are sealed connections, so no air escapes from any connection point.

FIG. 2B is a side view of the left half of the partial diffuser bar assembly of FIG. 2A, in accordance with an embodiment of the present invention. As seen in FIG. 2B, the air holes 211 are substantially evenly spaced along the length of the side pipe 210 and foot assembly 212 keeps the diffuser bar assembly 200 off the bottom wall 104 of the aeration chamber 110.

FIG. 2C is a cross-sectional view along line A-A of the left half of the partial diffuser bar assembly of FIG. 2A, in accordance with an embodiment of the present invention. As shown in FIG. 2C, the air holes 211 are on a mid-line of the pipe 210 and substantially perpendicular to a vertical axis 240 of the pipe 210.

Figure 3:
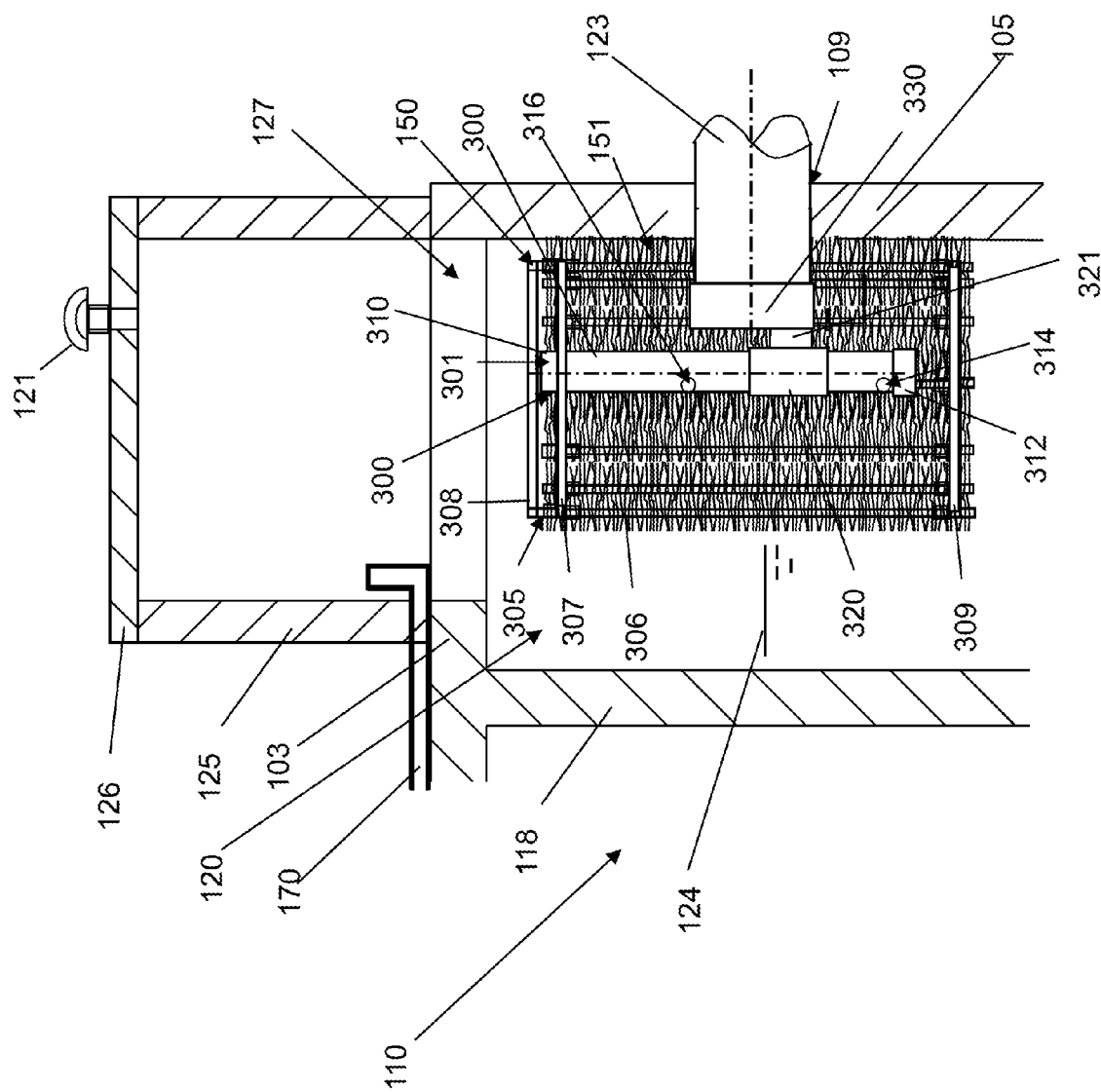
FIG. 3 is a partial, cross-sectional, side view of an upper portion of a clarification chamber of a two chamber wastewater treatment plant with a brush filter assembly, in accordance with an embodiment of the present invention.

FIG. 3 is a partial, cross-sectional, side view of an upper portion of a clarification chamber of a two chamber wastewater treatment plant with a brush filter assembly, in accordance with an embodiment of the present invention. FIG. 3, shows the flexible media filter 150 installed in the clarification chamber 120 and attached to the outlet pipe 123. The flexible media filter 150 includes a frame 305, which in this embodiment is substantially cylindrical in shape, around which the brush layer 151 is formed by multiple lengths of individual bristle filters are placed longitudinally up and down the side and across a bottom of the flexible media filter 150 with the bristles of adjoining bristle filters overlapping so there are no open areas into the inside of the flexible media filter 150. The frame 305 includes multiple vertical ribs 306 arranged around and rigidly connected to a top ring 307 and a bottom ring 309 where each of the vertical ribs extends above and below the top and bottom rings 307, 309 and has an inwardly extending flange portion (best seen in FIG. 5A) that can be used to affix the individual brush filters, and a top cross piece 308 for added stability of the frame 305.

As seen in FIG. 3, inside the flexible media filter 150 is a flow equalization assembly 300 that includes a vertical, cylindrical tube 310 with an open top 301, a bottom cap 312 that is sealingly affixed to a bottom end of the vertical, cylindrical tube 310, and a "T" connector 320 sealingly affixed below a middle of the vertical, cylindrical tube 310. The vertical, cylindrical tube 310 can be made, for example, from 1½ inch diameter PVC pipe. A bottom portion 321 of the "T" connector 320 extends substantially perpendicularly away from the vertical, cylindrical tube 310 toward and is sealingly connected to an outlet pipe cap 330 and is in fluid communication with the outlet pipe 123 through an opening 331 in a bottom portion of the outlet pipe cap 330. Just above the bottom cap 312 a standard flow port 314 is formed in the vertical, cylindrical tube 310 to permit fluid communication from inside the flexible media filter 150 to an inside of the vertical, cylindrical tube 310. The standard flow port 314 may have, for example, a uniform ¼ inch diameter and as shown is located below the surface liquid level 124 of the clarification chamber. At a height just slightly above a top of the outlet pipe cap 330, an elevated flow port 316 is formed in the vertical, cylindrical tube 310 to permit fluid communication from inside the flexible media filter 150 to an inside of the vertical, cylindrical tube 310 during peak flow periods when the standard flow port 314 cannot keep up with the high flow rate of effluent. The elevated flow port 316 may have, for example, a uniform ⅜ inch diameter. A peak flow port 301 is defined by the opening in the top of the cylindrical tube 310 and has a uniform 1.5 inch diameter and operates to remove excess effluent water in an overflow condition.

In FIG. 3, after effluent passes through the brush layer 151, the effluent can flow out of the system 100 through one or all of the standard flow port 314, the elevated flow port 316 and/or the peak flow port 301 and into the outlet pipe 123. The standard flow port 314 equalizes peak flow and enhances treatment efficiency. After filtration through the brush layer 151 and the standard flow port 314, a clear effluent that contains low suspended solids and low CBOD5 flows from the clarification tank and into the outlet pipe 123.

The flexible media filter 150 of FIG. 3 improves effluent quality from a residential sewage treatment plant over existing systems. This is because, in most filtration applications, a solid-rigid filtration media is installed in a filter or filtration unit and once the media is clogged, a cleaning process, for example, a backwashing process, must be applied before starting a new filtration cycle. Current solid-rigid filtration media include, for example, screen filtration, textile cloth filtration, sand bed filtration and gravel bed filtration, etc. Unfortunately, all of the above filters have a clogging problem after a certain period of operation. Usually, the filtration cycle time is not long, and can vary from hours to a number of days, depending upon the filtration surface area. The flexible media filtration of this system and process uses the property of flexible media and does not need backwash cleaning steps before a new filtration cycle can start. Instead, minor maintenance of the flexible media filter 150 is only needed after a long period of operation time, for example, after up to 34 weeks of use.

The design of the brush layer 151 can provide non-mechanical flow equalization for the wastewater treatment plant. Equalization reduces incoming hydraulic surges (e.g., a typical shower of 10 minutes duration, a bathtub discharge of 5 minutes duration, a clothes washer discharge of 2 minutes duration and a dishwasher discharge of 2 minutes duration) throughout the system. The flow equalization causes wastewater to be held upstream of the final outlet during hydraulic surges, which preserves treatment integrity and enhances system operation. The actual rate of equalization varies and depends upon specific loading patterns and the duration of each flow surge. As a result, hydraulic surges and periods of high wastewater flow are automatically reduced to protect the environment and all treatment plant processes on a demand use, as needed, basis.

Figure 4:
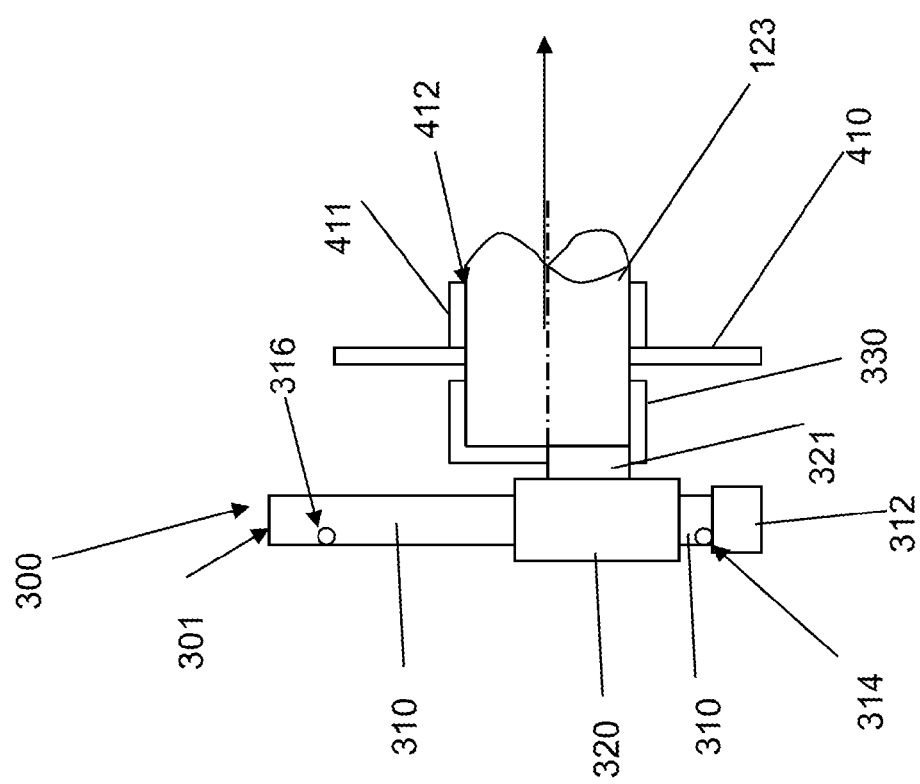
FIG. 4 is a side view of a flow equalization apparatus portion of the brush filter assembly of FIG. 3, in accordance with an embodiment of the present invention.

FIG. 4 is a side view of the flow equalization apparatus portion of the brush filter assembly of FIG. 3, in accordance with an embodiment of the present invention. In FIG. 4, the flow equalization apparatus 300 of FIG. 3 is shown without most of the outer frame 305 and bristle layer 151. A portion of an outlet panel 410 with a flange 411 are shown around an opening 412 formed in the outlet panel. The flange 411 has an inner diameter of a size to permit the outlet pipe 123 to pass through it to be connected to the outlet pipe cap 330.

Figure 5B:
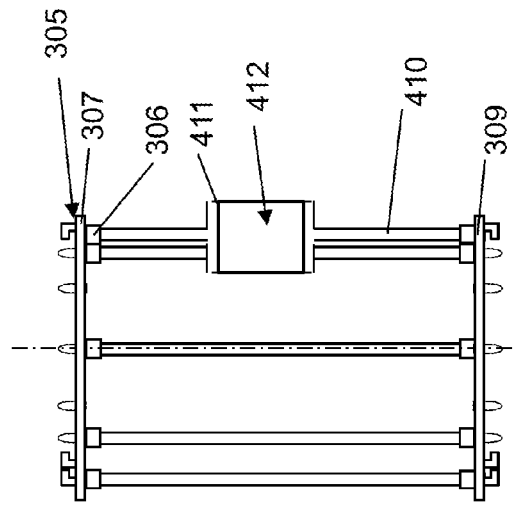
FIG. 5B is a side view of a filter frame of the brush filter assembly of FIG. 3, in accordance with an embodiment of the present invention.
Figure 5D:
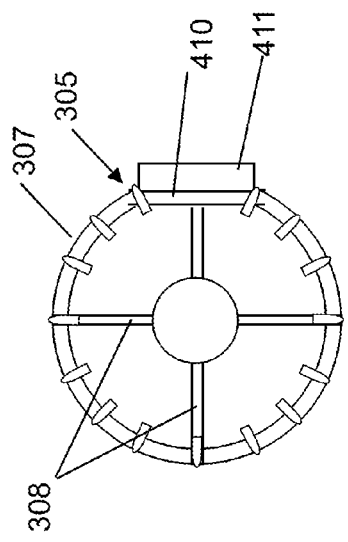
FIG. 5D is a top view of a filter frame of the brush filter assembly of FIG. 3, in accordance with an embodiment of the present invention.
Figure 5A:
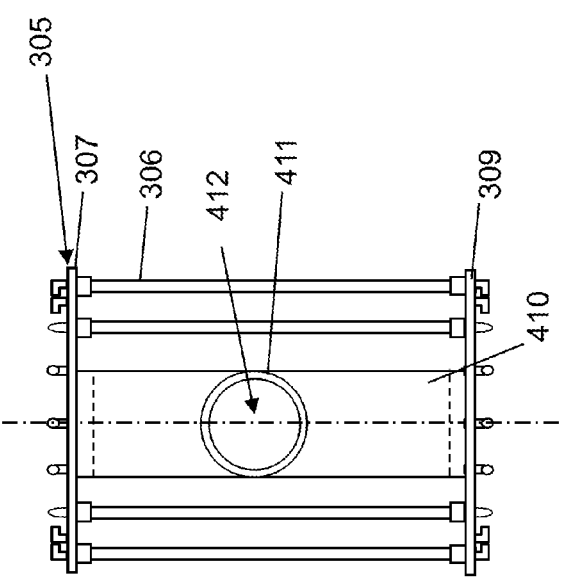
FIG. 5A is a cross-sectional, front view of a filter frame of the brush filter assembly of FIG. 3, in accordance with an embodiment of the present invention.

FIG. 5A is a front view from the front of the filter frame of the brush filter assembly of FIG. 3, in accordance with an embodiment of the present invention. In FIG. 5A, the filter frame 305 is shown without the flow equalization assembly and the brush layer to expose a front of the outlet panel 410 and a back end of the flange 411 that defines the opening 412.

FIG. 5B is a cross-sectional, side view of the filter frame of the brush filter assembly of FIG. 5A, in accordance with an embodiment of the present invention. In FIG. 5B, the filter frame 305 is shown without the flow equalization assembly and the brush layer to expose a side of the outlet panel 410 and a cross-section of the flange 411 and the opening 412. Although mostly obscured by the outlet panel 410, a vertical rib 306 is seen substantially behind and aligned with a plane of the outlet panel 410.

Figure 5C:
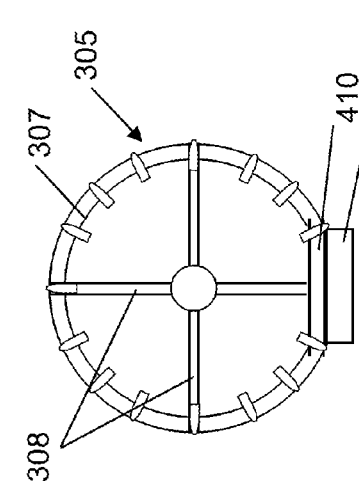
FIG. 5C is a bottom view of a filter frame of the brush filter assembly of FIG. 3, in accordance with an embodiment of the present invention.

FIG. 5C is a bottom view of the filter frame of the brush filter assembly of FIG. 5A, in accordance with an embodiment of the present invention. In FIG. 5C, the cross piece 308 can be seen connected across the filter frame 305 and connected to flanges at the tops of several vertical ribs 306 and also to a backside of the outlet panel 410.

FIG. 5D is a top view of the filter frame of the brush filter assembly of FIG. 5B, in accordance with an embodiment of the present invention. Similar to FIG. 5C, in FIG. 5D, the cross piece 308 can be seen connected across the filter frame 305 and connected to flanges at the tops of several vertical ribs 306 and also to a backside of the outlet panel 410.

FIG. 6A is a cross-sectional, view from the back of the filter frame of the brush filter assembly of FIG. 5A covered with individual brush filters 151, in accordance with an embodiment of the present invention. In FIG. 6A, the filter frame 305 is covered on the outside with multiple individual rope brush filters to form the rope brush filter 151 to at least cover each edge of the outlet filter panel 410, but not completely cover the flange 411 and the outlet opening 412 formed in the outlet filter panel 410, and across a bottom of the filter frame 305. The flexible media filtration apparatus consists of a rigid plastic or metal frame 305, the rope brush layer 151 and the flow equalization apparatus 300 (not shown here). The hairs of the individual rope brush filters overlap the hairs of adjacent brush filters in the rope brush filter 151 and catch floating sludge and solids and keep these contaminants away from the effluent outlet 123. After a period of operation, a certain amount of sludge will become attached to the hairs of the brush filters to form a bio-film filtration layer. If the bio-film grows too thick it produces more resistance to the effluent passing there through, which results in the water level outside of the filtration apparatus being higher than inside of the filter. Under such a condition, the water pressure caused by the increased water level differential pushes the brush hairs into and toward the inside of the filter. When this happens, the water level difference is eliminated and effluent keeps flowing out of the clarification chamber. In other words, because the brush filters form a flexible filtration layer, the flexibility is different from fixed filtration media in that it resolves the clogging problem by water pressure and rope elasticity. As a result, this type of filtration apparatus will not become clogged in a short period of time. In addition, the filter can be easily removed for cleaning or replacement, if needed.

FIG. 6B is a bottom view of the filter frame of FIG. 6A covered with individual brush filters to form the rope brush filter 151, in accordance with an embodiment of the present invention. As seen in FIG. 6B, there are no open areas between the individual brush filters.

Figure 7:
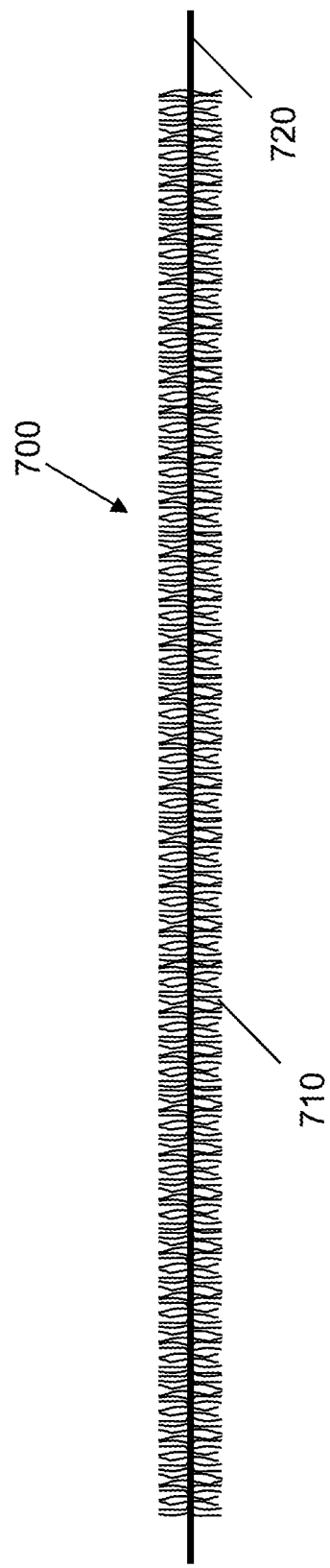
FIG. 7 is a side view of an individual brush filter, in accordance with an embodiment of the present invention.

FIG. 7 is a side view of an individual brush filter 700, in accordance with an embodiment of the present invention. As seen in FIG. 7, brush hairs 710 are evenly distributed along a length and around an outer circumference of a rope 720 and the rope 720 is made of a flexible and bendable material to permit the easy attachment and removal of each rope 720 to the filter frame 305.

FIG. 8A is a top view of a diffuser bar assembly for use in a two chamber wastewater treatment plant, in accordance with another embodiment of the present invention. In FIG. 8A, a diffuser bar assembly 800 plays a key role in the aeration process as the main function of the diffuser bar 800 is to get fresh air into the wastewater liquid 112 and to mix the liquid 112 in the aeration chamber 110. To do this, the diffuser bar assembly 800 is connected by the vertical pipe 141, all of which can be made from, for example, ¾ diameter inch PVC pipe and ¾ inch pipe connectors, to the air pump 130, which is run continuously. The diffused air from the diffuser bar assembly 800 provides oxygen through multiple holes (see 811, 821' in FIGS. 8B and 8C) along both sides of its lengths and widths, respectively, for the aerobic bacteria, mixing of the wastewater, as well as an extended retention period. The continuous air flow release creates the rolling effect in the aeration chamber 110 described above in relation to FIG. 2A to keep the water constantly mixing. In FIG. 8, for the best aeration possible, the air holes 811, 821' are specially designed to have ¹⁄₁₆ inch diameters and to create medium sized bubbles that quickly transfer oxygen to the liquid as well as break down solids more efficiently. Although in FIG. 8A, the air holes 811, 821' are not shown around a perimeter of and on the diffuser bar assembly 800 they are shown in FIGS. 8B and 8C.

In FIG. 8A, the diffuser bar assembly 800 includes two halves 801, 801' of about 24 inches in length each and each is connected to the other by a center section 805 that includes connection points for fluid communication between the diffuser bar assembly 800 through the vertical pipe 141 to the air pump 130. The center section 805 includes a central upright "T" connector 830 with a top opening that connects to a bottom of the vertical pipe 141 and two side openings that connect to short sections of pipe 832 that are in turn each connected to bottom openings of respective sideways "T" connectors 833. The top openings of each "T" connector connect to ends of lengths of side pipes 810, 810'. As seen in FIG. 8A, the left half 801 includes two sides 810 of lengths of pipe with about 30, ¹⁄₁₆ inch holes spaced apart by about ¹¹⁄₁₆ inches on center along a middle of each side of each pipe. An end of one side pipe 810a is connected to a bottom opening of a first "T"-connector 822 that includes at least two openings oriented at about 90 degree angles to the bottom opening and one end of a left end pipe section 820 is connected to a first top opening of the first "T"-connector 822. An end of the second side pipe 810b is connected to a first opening of an elbow connector 824 that includes at least two openings oriented at about 90 degree angles to each other and another end of the left end pipe section 820 is connected to the other opening of the elbow connector 824. A cap 823 is connected to a second top opening of the first "T"-connector 822 and extends substantially perpendicularly away from the one side pipe 810a. The cap 823 is designed to be placed against a side wall of the aeration chamber 110 to space the one side pipe 810a away from the side wall to permit air to escape from the holes in the one side pipe 810a. All joints and connections in the diffuser bar assembly 800 are air tight, so the only way for the air to escape from inside of the diffuser bar assembly 800 is through the air holes 811, 821'.

FIG. 8B is a side view of the left half of the diffuser bar assembly of FIG. 8A, in accordance with an embodiment of the present invention. As seen in FIG. 8B, the ¹⁄₁₆ inch air holes 811 are substantially evenly spaced along the length of the side pipes 810a, 810a', for example, about ¾ inches on center apart and foot assembly 812, 812' keeps the diffuser bar assembly 800 off of the bottom wall. 104 of the aeration chamber 110. The foot assembly 812 is attached to each side pipe 810a, 810b of the left half 801 adjacent to the end of each side pipe 810a, but does not impede air flow within the diffuser bar assembly 800, and the foot assembly 812' is attached to each side pipe 810a', 810b' of the right half 801' adjacent to the end of each side pipe 810a', and also does not impede air flow within the diffuser bar assembly 800. A foot 813, 813' is attached at the bottom of each foot assembly 812, 812'. The other half of the diffuser assembly 800 is similarly assembled and all connections are sealed connections, so no air escapes from any connection point. The vertical air pipe 141 can be removably connected to the central upright "T" connector 830 to aid in the installation and removal of the diffuser assembly 800. For example, but not limited to, the top opening of the central upright "T" connector 830 can include threads (not shown) that can be removably connected to a bottom of the vertical pipe 141 by threads 880 located on the bottom of the vertical pipe 141. In embodiments of the present invention, the diffuser assembly 800 can be constructed using rigid and/or flexible PVC or other type of conduit.

FIG. 8C is an end view along of the partial diffuser bar assembly of FIG. 8A, in accordance with an embodiment of the present invention. As shown in FIG. 8C, the air holes 821' are on a mid-line of the pipe 820' and substantially perpendicular to a vertical axis of the pipe 820'.

Figure 9:
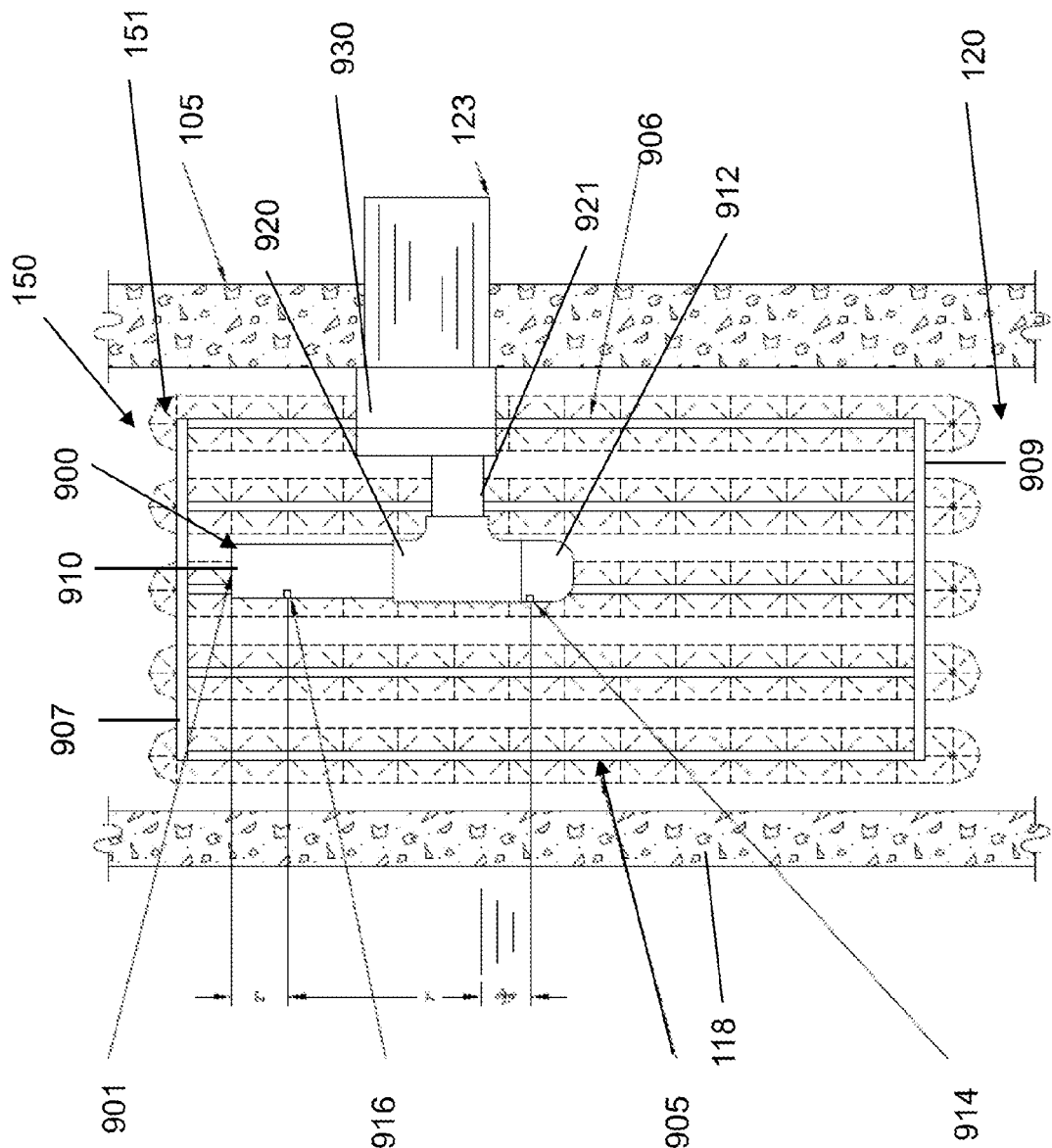
FIG. 9 is a partial, cross-sectional, side view of an upper portion of a clarification chamber of a two chamber wastewater treatment plant with a brush filter assembly and a flow equalization apparatus, in accordance with an embodiment of the present invention.

FIG. 9 is a partial, cross-sectional, side view of an upper portion of a clarification chamber of a two chamber wastewater treatment plant with a brush filter assembly, in accordance with an embodiment of the present invention. FIG. 9, shows the flexible media filter 150 installed in the clarification chamber 120 and attached to the outlet pipe 123. The flexible media filter 150 includes a frame 905, which in this embodiment is substantially cylindrical in shape, around which the brush layer 151 is formed by multiple lengths of individual bristle filters are placed longitudinally up and down the side and across a bottom of the flexible media filter 150 with the bristles of adjoining bristle filters overlapping so there are no open areas into the inside of the flexible media filter 150. The frame 905 includes multiple vertical ribs 906 arranged around and rigidly connected to a top ring 907 and a bottom ring 909 where each of the vertical ribs extends above and below the top and bottom rings 907, 909.

As seen in FIG. 9, inside the flexible media filter 150 is a flow equalization assembly 900 that includes a vertical, cylindrical tube 910 with an open top 901, a bottom cap 912 that is sealingly affixed to a bottom end of the vertical, cylindrical tube 910, and a "T" connector 920 sealingly affixed below a middle of the vertical, cylindrical tube 910. The vertical, cylindrical tube 910 can be made, for example, from 1½ inch diameter PVC pipe. A bottom portion 921 of the "T" connector 920 extends substantially perpendicularly away from the vertical, cylindrical tube 910 toward and is sealingly connected to an outlet pipe cap 930 and is in fluid communication with the outlet pipe 123 through an opening (not shown) in a bottom portion of the outlet pipe cap 930. Just above the bottom cap 912 a standard flow port 914 that is formed in the vertical, cylindrical tube 910 to permit fluid communication from inside the flexible media filter 150 to an inside of the vertical, cylindrical tube 910. The standard flow port 914 may have, for example, a uniform ¼ inch diameter. At a height about 2 inches below a top of the vertical, cylindrical tube 910, the elevated flow port 916 is formed in the vertical, cylindrical tube 910 to permit fluid communication from inside the flexible media filter 150 to an inside of the vertical, cylindrical tube 910 during peak flow periods when the standard flow port 914 cannot keep up with the high flow rate of effluent. The elevated flow port 916 may have, for example, a uniform ⅜ inch diameter. A peak flow port 901 is defined by the opening in the top of the vertical, cylindrical tube 910 and has a uniform 1.5 inch diameter and operates to remove excess effluent in an overflow condition.

In FIG. 9, after effluent passes through the brush layer 151, the effluent can flow out of the system 900 through one or all of the standard flow port 914, the elevated flow port 916 and the peak flow port 901 and into the outlet pipe 123. The standard flow port 914 equalizes flow and enhances treatment efficiency. After filtration through the brush layer 151 and the standard flow port 914, a clear effluent that contains low suspended solids and low CBOD5 flows from the clarification tank and into the outlet pipe 123.

The flexible media filter 150 of FIG. 9 improves effluent quality from a residential sewage treatment plant over existing systems. This is because, in most filtration applications, a solid-rigid filtration media is installed in a filter or filtration unit and once the media is clogged, a cleaning process, for example, a backwashing process, must be applied before starting a new filtration cycle. Current solid-rigid filtration media include, for example, screen filtration, textile cloth filtration, sand bed filtration and gravel bed filtration, etc. Unfortunately, all of the above filters have a clogging problem after a certain period of operation. Usually, the filtration cycle time is not long, and can vary from hours to a number of days, depending upon the filtration surface area. The flexible media filtration of this system and process uses the property of flexible media and does not need backwash cleaning steps before a new filtration cycle can start. Instead, minor maintenance of the flexible media filter 150 is only needed after a long period of operation time, for example, after up to 34 weeks of use.

The design of the brush layer 151 provides non-mechanical flow equalization for the wastewater treatment plant. Equalization reduces incoming hydraulic surges (e.g., a typical shower of 10 minutes duration, a bathtub discharge of 5 minutes duration, a clothes washer discharge of 2 minutes duration and a dishwasher discharge of 2 minutes duration) throughout the system. The flow equalization causes wastewater to be held upstream of the final outlet during hydraulic surges, which preserves treatment integrity and enhances system operation. The actual rate of equalization varies and depends upon specific loading patterns and the duration of each flow surge. As a result, hydraulic surges and periods of high wastewater flow are automatically reduced to protect the environment and all treatment plant processes on a demand use, as needed, basis.

In accordance with an embodiment of the present invention, a wastewater treatment apparatus includes a first chamber including an inlet opening defined in an inlet wall and a lower chamber portion; a second chamber including an outlet opening defined in an outlet wall and a lower chamber portion; and a common wall between said first and second chambers, the common wall having a bottom opening in a lowermost portion and the common wall bottom opening providing immediate and direct fluid communication between the lower chamber portion of the first chamber and the lower chamber portion of the second chamber. The apparatus also includes a diffuser bar assembly having a substantially rectangular shape with a length about 4 times a width of the assembly and being oriented with the length extending from the inlet wall of the first chamber toward the common wall and the diffuser bar assembly including a plurality of holes spaced substantially evenly around opposite sides of the diffuser bar assembly; a continuously operating air pump being connected to a proximal end of an air line and the air line being in gaseous communication with the diffuser bar assembly; and an outlet filter assembly connected to and in fluid communication with the outlet opening. The outlet filter assembly includes a brush filter assembly including a substantially cylindrical frame element made of two substantially circular plastic end portions being rigidly connected to each other by a plurality of plastic rods and an outlet face side portion having formed therein an outlet line access port, and a plurality of brush rope elements attached to and substantially covering an outer side surface and a bottom of the substantially cylindrical frame element, and a flow equalization apparatus including an upright cylindrical tube having a closed bottom end, an open top end, an outlet tube connected to and extending substantially perpendicularly away from and in fluid communication with the upright cylindrical tube, the outlet tube extending through an outlet line cap attached to an end of an outlet line inside the brush filter assembly and into and in fluid communication with the outlet line, a standard flow port formed in the upright cylindrical tube between the closed bottom end of the upright cylindrical tube and the outlet tube, an elevated flow port formed in the upright cylindrical tube adjacent an open top end of the upright cylindrical tube and above the outlet tube, and a peak flow port being defined by the open top end of the upright cylindrical tube.

In accordance with an embodiment of the present invention, a wastewater treatment system includes an aeration chamber including an outlet wall, an inlet wall, a top wall, a bottom wall, a left side wall, a right side wall, an inlet opening formed in the inlet wall and permitting direct fluid communication between an inside of the aeration chamber and an inlet pipe affixed in the inlet opening, an access opening formed in the aeration chamber top wall, an aeration chamber access opening riser sealingly positioned around the aeration chamber access opening and an aeration chamber riser cover removably positioned on top of the aeration chamber access opening riser, and an aeration chamber inlet vent formed in the riser cover; and a clarification chamber adjacent to and separated from the aeration chamber by a common wall extending substantially perpendicularly downwardly away from a bottom surface of a top wall of the clarification chamber toward a top surface of a bottom wall of the clarification chamber, the clarification chamber further including an outlet wall, an inlet wall, a left side wall, a right side wall, and an outlet opening formed in the clarification chamber outlet wall and being in immediate and direct fluid communication with an outside of the clarification chamber via an outlet pipe affixed in the outlet opening, and a clarification chamber access opening formed in the clarification chamber top wall, a clarification chamber access opening riser sealingly positioned around the clarification chamber access opening and a clarification chamber riser cover removably positioned on top of the clarification chamber access opening riser, and a clarification chamber inlet vent formed in the clarification chamber riser cover. The system further includes an air release line extending from and in fluid communication with an inside of the aeration chamber and along the top of the top wall toward, through and into the clarification chamber access opening riser to permit the escape of air from the first chamber into the clarification chamber access opening riser; a diffuser bar assembly including a plurality of connected pipe sections and having a substantially rectangular shape with a length about 4 times a width of the diffuser bar assembly and being oriented with the length extending from the inlet wall of the aeration chamber toward the common wall and the diffuser bar assembly including a plurality of holes spaced substantially evenly around opposite sides of each side of each pipe section of the diffuser bar assembly; a continuously circulating air pump located in the aeration chamber riser and being connected to a proximal end of an air line and a distal end of the air line being connected to the diffuser bar assembly and the air pump being in gaseous communication with the diffuser bar assembly via the air line; and an outlet filter assembly surrounding and connected to the outlet pipe. The outlet filter assembly includes a brush filter assembly including a substantially cylindrical frame element made of two substantially circular plastic end portions that are rigidly connected by a plurality of plastic rods and an outlet face side portion having formed therein an outlet line access port, and a plurality of brush rope elements attached to and covering around an outer side surface and a bottom of the cylindrical frame element, and a flow equalization apparatus including an upright cylindrical tube having a closed bottom end, an outlet tube connected to and extending substantially perpendicularly away from and in fluid communication with the upright cylindrical tube, the outlet tube extending through an outlet pipe cap attached to an end of an outlet pipe inside the brush filter assembly and into and in fluid communication with the outlet pipe, a standard flow port formed in the upright cylindrical tube between the closed bottom end of the upright cylindrical tube and below the outlet tube, an elevated flow port formed in the upright cylindrical tube between an open top end of the upright cylindrical tube and above the outlet tube, and a peak flow port being defined by the open top end of the upright, cylindrical tube.

In accordance with an embodiment of the present invention, a wastewater treatment system includes a dual chamber tank including an outlet wall, an inlet wall, a top wall, a bottom wall, a left side wall, a right side wall, and a common inner wall, the dual chamber tank further including: an aerobic chamber including an inlet opening formed in the inlet wall, the inlet opening adapted for an inlet line to pass through the inlet opening into and be in immediate and direct fluid communication with an inside of the aerobic chamber, an air line opening formed in a top wall of the tank, an access opening cover sealingly positioned in an access opening formed in the tank top wall, and an aeration exhaust vent formed in the tank top wall; and a clarification chamber adjacent to and separated from the aerobic chamber by a common wall extending substantially perpendicularly downwardly away from a bottom side of the tank top wall toward a top side of a bottom wall of the tank, the clarification chamber including an outlet opening formed in an outlet wall of the tank and adapted for an outlet line to pass from inside the clarification chamber and through the outlet wall and to be in immediate and direct fluid communication with an outside of the tank, and an access opening formed in the tank top wall above the clarification chamber. The system further including a diffuser bar assembly having a substantially rectangular shape with a length at least 4 times a width of the assembly and being oriented with the length extending from the inlet wall toward the common wall and the diffuser bar assembly including at least 200 $\frac{1}{16}$" diameter holes spaced substantially evenly around opposite side sections of the diffuser bar assembly; an air pump riser assembly covering the air pump and surrounding the air line opening and being sealingly connected to the tank top wall; an inspection riser assembly covering the access opening and being sealingly connected to the tank top wall; and an outlet filter assembly. The outlet filter assembly including a brush filter assembly including a substantially cylindrical frame element made of two substantially circular plastic end portions being rigidly connected by a plurality of plastic rods and an outlet face side portion having formed therein an outlet line access port, and a plurality of brush rope elements attached to and covering around an outer side surface and a bottom of the cylindrical frame element, and a flow equalization apparatus including an upright cylindrical tube having a closed bottom end, an outlet tube connected to and extending substantially perpendicularly away from and in fluid communication with the upright cylindrical tube, the outlet tube extending through an outlet pipe cap attached to an end of an outlet pipe inside the clarification chamber and being in fluid communication with the outlet pipe, a standard flow port formed in the upright cylindrical tube between the closed bottom end of the upright cylindrical tube and the outlet tube, an elevated flow port formed in the upright cylindrical tube below an open top end of the upright cylindrical tube and above the outlet tube, and a peak flow port being defined by the open top end of the upright cylindrical tube.

In accordance with an embodiment of the present invention, a wastewater treatment system including a dual chamber tank, the dual chamber tank including an aeration chamber including an inlet opening formed in an inlet wall adapted for an inlet pipe to pass through the inlet opening and into the aeration chamber, the inlet pipe being in immediate and direct fluid communication with an inside of the aeration chamber, an aeration chamber access opening formed in a top wall of the tank, an access opening riser and riser cover sealingly positioned over the aeration chamber access opening on the tank top wall, and an aeration chamber air inlet vent formed in the access opening riser cover; a clarification chamber adjacent to and separated from the aeration chamber by a common wall extending substantially perpendicularly downwardly away from a bottom side of the top wall toward a top side of a bottom wall of the tank, the clarification chamber including an outlet opening formed in an outlet wall of the clarification chamber and being adapted for an outlet pipe to pass from inside the clarification chamber and through the clarification chamber outlet wall and to be in immediate and direct fluid communication with an outside of the clarification chamber, and a clarification chamber access opening formed in the tank top wall. The system further including a diffuser bar assembly having a substantially rectangular shape and having a length and a width and the diffuser bar assembly being oriented with the length extending from the inlet wall toward the common wall and the diffuser bar assembly including at least 200 $\frac{1}{16}$" diameter holes spaced substantially evenly along opposite sides of each length of the diffuser bar assembly; an air line having a proximal end extending downwardly through the aeration chamber access opening and extending downwardly through the aeration chamber and a distal end of the air line connecting to the diffuser bar assembly; an air pump connected on an inlet side to and receiving air from the aeration chamber air inlet vent and on an outlet side to the proximal end of the air line and being in fluid communication with the diffuser bar assembly via the air line; a clarification chamber riser assembly surrounding the clarification chamber access opening and being sealingly connected to the tank top wall; and an outlet filter assembly connected to and surrounding an inlet end of the outlet pipe of the clarification chamber. The outlet filter assembly including a brush filter assembly including a substantially cylindrical frame element having two substantially circular plastic end portions being rigidly connected by a plurality of plastic rods and an outlet face side portion having formed therein an outlet line access port, and a plurality of brush rope elements attached to and covering around an outer side surface and a bottom of the cylindrical frame element, and a flow equalization apparatus including an upright cylindrical tube having a closed bottom end, an outlet tube connected to and extending substantially perpendicularly away from and in fluid communication with the upright cylindrical tube, the outlet tube extending through an outlet pipe cap attached to an end of an outlet pipe inside the clarification chamber and being in fluid communication with the outlet pipe, a standard flow port formed in the upright cylindrical tube between the closed bottom end of the upright cylindrical tube and the outlet tube, an elevated flow port formed in the upright cylindrical tube below an open top end of the upright cylindrical tube and above the outlet tube, and a peak flow port being defined by the open top end of the upright cylindrical tube.

In accordance with an embodiment of the present invention, a wastewater treatment system including an at least two chamber tank including means for aeration of wastewater including an inlet opening means in fluid communication with the aeration means, an aeration access opening means, a riser assembly means sealingly positioned over and covering the aeration chamber access opening means, and an air inlet means formed in the riser assembly means; means for clarification of treated wastewater from the aeration means, the clarification means being in direct fluid communication with the aeration means and means for outputting finally treated effluent; means for diffusing air into the aeration means; means for pumping air in fluid communication with the diffusing means; means for filtering connected to an outlet pipe in the clarification means, the filtering means including brush filter means, and flow equalization means including standard flow means, elevated flow means, and peak flow means.

A method of filtering wastewater including receiving wastewater in an aeration chamber; providing a constant flow of air bubbles from a diffuser bar located adjacent a corner formed by a connection between a bottom wall and a side wall of the aeration chamber, the air bubbles operating to create an upward flow of the wastewater to permit aerobic bacteria present in the aeration chamber to aerobically treat the wastewater by converting organic matter in the wastewater into one or more stable substances; flowing the aerobically treated wastewater from the aeration chamber into a clarification chamber; settling biologically active material out of the aerobically treated wastewater to a bottom of the clarification chamber; filtering the aerobically treated wastewater through a flexible media filter and catching solids in the wastewater in bristles in the flexible media filter as the aerobically treated wastewater passes through the flexible media filter; passing the filtered aerobically treated wastewater through a standard flow port formed in and adjacent to a bottom of an upright cylindrical tube portion of a flow equalization apparatus; and passing the wastewater that passed through the standard flow port into an outlet pipe and out of the clarification chamber.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. A wastewater treatment apparatus comprising:
   a first chamber including an inlet opening defined in an inlet wall and a lower chamber portion;
   a second chamber including an outlet opening defined in an outlet wall and a lower chamber portion;
   a common wall between said first and second chambers, the common wall having a bottom opening in a lowermost portion and the common wall bottom opening providing direct fluid communication between the lower chamber portion of the first chamber and the lower chamber portion of the second chamber;
   a diffuser bar assembly having a substantially rectangular shape with a length about 4 times a width of the assembly and being oriented with the length extending from the inlet wall of the first chamber toward the common wall and the diffuser bar assembly including a plurality of holes spaced substantially evenly around opposite sides of the diffuser bar assembly along the diffuser bar assembly length and width;

a continuously operating air pump being connected to a proximal end of an air line and the air line being in gaseous communication with the diffuser bar assembly; and an outlet filter assembly connected to and in fluid communication with the outlet opening, the outlet filter assembly comprising:

a brush filter assembly including a substantially cylindrical frame element made of two substantially circular plastic end portions being rigidly connected to each other by a plurality of plastic rods and an outlet face side portion having formed therein an outlet line access port, and a plurality of brush rope elements attached to and substantially covering an outer side surface and a bottom of the substantially cylindrical frame element and each of the plurality of brush rope elements including a flexible and bendable rope center and plurality of hairs substantially evenly distributed along a length of and around an outer circumference of the flexible and bendable rope center, and a flow equalization apparatus including an upright cylindrical tube having a closed bottom end, an open top end, an outlet tube connected to and extending substantially perpendicularly away from and in fluid communication with the upright cylindrical tube, the outlet tube extending through an outlet line cap attached to an end of an outlet line inside the brush filter assembly and into and in fluid communication with the outlet line, a standard flow port formed in the upright cylindrical tube between the closed bottom end of the upright cylindrical tube and the outlet tube, an elevated flow port formed in the upright cylindrical tube adjacent an open top end of the upright cylindrical tube and above the outlet tube, and a peak flow port being defined by the open top end of the upright cylindrical tube.

2. The wastewater treatment apparatus of claim 1, wherein the first chamber further comprises:

a top wall extending substantially perpendicularly away from a top end of the inlet wall and extending toward and connecting to a top end of the common wall and the top wall continuing toward and connecting to a top end of the outlet wall of the second chamber, the common wall extending substantially perpendicularly downwardly away from the top wall, a first chamber access opening formed in the top wall above the first chamber, and a second chamber access opening formed in the top wall above the second chamber;

a bottom wall extending substantially perpendicularly away from a bottom end of the inlet wall and extending toward and connecting to a bottom end of the outlet wall of the second chamber;

a pair of opposite side walls each extending substantially perpendicularly away from opposite side edges of the inlet wall, along opposite side edges of the top wall and the bottom wall toward and connecting to opposite side edges of the common wall;

a first riser assembly encircling the first chamber access opening and connected to a top side of the top wall above the first chamber;

a second riser assembly encircling the second chamber access opening and connected to a top side of the top wall above the second chamber; and an air release line extending from inside the first riser assembly and along the top of the top wall toward and into the second riser assembly to permit the escape of air from the first chamber.

3. The wastewater treatment apparatus of claim 2, wherein each riser assembly comprises:

a substantially cylindrical wall encircling a respective access opening and sealingly connected to the top side of the top wall above its respective chamber;

a cover removeably positioned on a top edge of the substantially cylindrical wall; and a vent assembly affixed to a top of the cover and extending through the cover to permit fluid communication between an air space outside of the tank and the inside of the riser assembly and tank.

4. The wastewater treatment apparatus of claim 3, wherein the vent assembly affixed to the first riser assembly only permits air to flow into the first riser assembly; and the vent assembly affixed to the second riser assembly permits air to flow into and out of the second riser assembly.

5. The wastewater treatment apparatus of claim 1, wherein the plurality of holes in the diffuser bar assembly are approximately 1/16 inch in diameter.

6. The wastewater treatment apparatus of claim 5, wherein the plurality of holes in the diffuser bar assembly are arranged in pairs substantially aligned on opposite sides along the diffuser bar assembly length and width and along a middle of a plurality of approximately 3/4 inch diameter pipe sections.

7. The wastewater treatment apparatus of claim 6, wherein the plurality of holes in the diffuser bar assembly comprises about 60 along each side of each length of the diffuser bar assembly and about 4 along each side of each width of the diffuser bar assembly.

8. The wastewater treatment apparatus of claim 7, wherein the diffuser bar assembly comprises a plurality of support elements extending downwardly from a bottom of the diffuser bar assembly.

9. The wastewater treatment apparatus of claim 7, wherein the diffuser bar assembly comprises an air inlet tube extending upwardly from a center portion of the diffuser bar assembly and the center portion being in fluid communication with both lengths and both widths of the diffuser bar assembly.

10. The wastewater treatment apparatus of claim 1, wherein the standard flow port comprises a 1/4 inch diameter opening positioned about 2 inches below a bottom of the outlet tube.

11. The wastewater treatment apparatus of claim 10, wherein the elevated flow port comprises a 3/8 inch diameter opening positioned about 2.5 inches below a top of the upright cylindrical tube and about 7 inches above the bottom of the outlet tube.

12. The wastewater treatment apparatus of claim 1, wherein the upright cylindrical tube comprises a 1.5 inch diameter PVC pipe and the peak flow port defined thereby comprises a 1.5 inch diameter opening.

13. The wastewater treatment apparatus of claim 12, wherein the bottom of the outlet tube is substantially parallel to and aligned with a bottom of the outlet line.

14. A flexible media filter comprising:

a substantially cylindrical frame element comprising two substantially circular end portions rigidly connected to each other by a plurality of substantially evenly spaced-apart rods and an outlet face side portion; and a plurality of brush rope elements attached to and substantially covering an outer side surface and a bottom of the substantially cylindrical frame element and each of the plurality of brush rope elements further comprises a flexible and bendable rope center and plurality of hairs substantially evenly distributed along a length of and around an outer circumference of the flexible and bendable rope center.

15. The flexible media filter of claim 14 wherein the substantially cylindrical frame element comprises a rigid plastic.

16. The flexible media filter of claim 14 wherein the outlet face portion comprises an outlet line access port formed therein.

17. A method of filtering wastewater comprising:
receiving wastewater in an aeration chamber;
providing a constant flow of air bubbles from a diffuser bar located adjacent a corner formed by a connection between a bottom wall and a side wall of the aeration chamber, the air bubbles operating to create an upward flow of the wastewater to permit aerobic bacteria present in the aeration chamber to aerobically treat the wastewater by converting organic matter in the wastewater into one or more stable substances;
flowing the aerobically treated wastewater from the aeration chamber into a clarification chamber;
settling biologically active material out of the aerobically treated wastewater to a bottom of the clarification chamber;
filtering the aerobically treated wastewater through a flexible media filter with a plurality of brush rope elements comprising a flexible and bendable rope center and plurality of hairs substantially evenly distributed along a length of and around an outer circumference of the flexible and bendable rope center, and catching solids in the wastewater in the plurality of hairs in the flexible media filter as the aerobically treated wastewater passes through the flexible media filter;
passing the filtered aerobically treated wastewater through a standard flow port formed in and adjacent to a bottom of an upright cylindrical tube portion of a flow equalization apparatus; and
passing the wastewater that passed through the standard flow port into an outlet pipe and out of the clarification chamber.

18. The method of filtering wastewater of claim 17 wherein the passing the filtered aerobically treated wastewater through a standard flow port further comprises passing the filtered aerobically treated wastewater through an elevated flow port formed in and adjacent to a top of the upright cylindrical tube portion of the flow equalization apparatus.

19. The method of filtering wastewater of claim 18 further comprises passing the filtered aerobically treated wastewater through a peak flow port formed in and by the top of the upright cylindrical tube portion of a flow equalization apparatus.

* * * * *